United States Patent
Togo (10) Patent No.: US 9,222,383 B2
(45) Date of Patent: Dec. 29, 2015

(54) WORKING VEHICLE INCLUDING EXHAUST GAS TREATMENT DEVICE

(71) Applicant: Kubota Corporation, Osaka-shi (JP)

(72) Inventor: Manabu Togo, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 14/024,304

(22) Filed: Sep. 11, 2013

(65) Prior Publication Data

US 2014/0083791 A1 Mar. 27, 2014

(30) Foreign Application Priority Data

Sep. 26, 2012 (JP) ................................ 2012-213247

(51) Int. Cl.
| | |
|---|---|
| *B60K 13/04* | (2006.01) |
| *F01N 13/18* | (2010.01) |
| *F01N 3/08* | (2006.01) |
| *F01N 3/10* | (2006.01) |
| *F01N 3/035* | (2006.01) |

(52) U.S. Cl.
CPC . *F01N 3/08* (2013.01); *B60K 13/04* (2013.01); *F01N 3/035* (2013.01); *F01N 3/103* (2013.01); *F01N 13/1805* (2013.01); *F01N 13/1811* (2013.01); *F01N 13/1816* (2013.01); *F01N 2430/08* (2013.01); *F01N 2430/10* (2013.01); *F01N 2450/24* (2013.01)

(58) Field of Classification Search
CPC .............................. B60K 13/04; F01N 13/1811
USPC ............................ 180/291, 292, 296, 309, 312
See application file for complete search history.

(56) References Cited

U.S. PATENT DOCUMENTS

| | | | | |
|---|---|---|---|---|
| 3,459,444 A | * | 8/1969 | Rofe | 285/226 |
| 3,779,329 A | * | 12/1973 | Duke et al. | 180/291 |
| 4,133,547 A | * | 1/1979 | Fox | 180/68.3 |
| 6,315,332 B1 | * | 11/2001 | Aschoff et al. | 285/227 |
| 7,614,475 B2 | * | 11/2009 | Askew | 180/309 |
| 2010/0031644 A1 | * | 2/2010 | Keane et al. | 60/295 |
| 2010/0126791 A1 | * | 5/2010 | Okada | 180/296 |
| 2010/0275588 A1 | * | 11/2010 | Kamata et al. | 60/322 |
| 2011/0167808 A1 | | 7/2011 | Kosaka et al. | |
| 2012/0102932 A1 | | 5/2012 | Mitsuda | |
| 2012/0247861 A1 | | 10/2012 | Mizuno et al. | |

FOREIGN PATENT DOCUMENTS

| | | | |
|---|---|---|---|
| JP | 2008248814 A | 10/2008 | |
| JP | 2010216336 A | 9/2010 | |
| JP | 201272722 A | 4/2012 | |
| WO | 2011001997 A1 | 1/2011 | |
| WO | 2011152306 A1 | 12/2011 | |

* cited by examiner

*Primary Examiner* — Frank Vanaman
(74) *Attorney, Agent, or Firm* — The Webb Law Firm (57) ABSTRACT

A working vehicle includes an engine, a vehicle body frame on which the engine is mounted, an exhaust gas treatment device for treating exhaust gas of the engine, and a fixing base for fixing the exhaust gas treatment device, and the fixing base is separated from the engine by a gap. Furthermore, a support body for connecting the fixing base to the vehicle body frame is also separated from the engine by a gap. A bellows pipe for absorbing solid-borne sound is provided in an area where a suction pipe of the exhaust gas treatment device is connected to an exhaust manifold of the engine.

16 Claims, 11 Drawing Sheets

WORKING VEHICLE INCLUDING EXHAUST GAS TREATMENT DEVICE

CROSS-REFERENCE TO RELATED APPLICATION

This application claims priority to Japanese Patent Application No. 2012-213247, filed Sep. 26, 2012, the disclosure of which is hereby incorporated in its entirety by reference.

BACKGROUND OF THE INVENTION

1. Field of the Invention

The present invention relates to a working vehicle in which an exhaust gas treatment device for treating exhaust gas from an engine is disposed in the vicinity of the engine.

2. Description of the Related Art

JP 2010-216336A (see FIG. 8) discloses a DPF (Diesel particulate filter: an example of an exhaust gas treatment device) that is disposed above an engine. An exhaust gas inlet pipe of the DPF includes an upper pipe portion that extends horizontally from the DPF and a lower pipe portion that extends vertically from an extended end of the upper pipe portion, and the exhaust gas inlet pipe is an elbow pipe that is bent at a right angle as a whole. The exhaust gas inlet pipe is further connected to an exhaust communicating pipe via a bolt flange coupling. This DPF is coupled to a cylinder head, that is to say, an engine housing via a support block body having a rigid structure.

US Patent Application Publication No. 2011/0167808 discloses an exhaust gas treatment device that is disposed above an engine and fixed to the engine via two support stays and one support flange. An exhaust pipe connected to the engine is bent at a right angle such that a terminal portion of the exhaust gas pipe is opened upward, and the exhaust pipe is coupled to an exhaust gas introduction pipe that extends downward from the exhaust gas treatment device via a bolt flange coupling.

US Patent Application Publication No. 2012/0102932 discloses a DPF that is disposed on the side of a flywheel housing coupled to an engine body and fixed to the flywheel housing via a bracket leg. An exhaust gas inlet pipe that extends radially from the DPF is coupled, via a bolt flange coupling, to an exhaust gas discharge pipe that is coupled to an exhaust manifold of the engine.

As mentioned above, a conventional exhaust gas treatment device, which is fixed to an engine or an engine accessory via a support member, is inconvenient in that vibration of the engine is transmitted directly to the exhaust gas treatment device via a support member. However, the exhaust gas treatment device needs to be disposed in the vicinity of the engine, giving consideration to a limited space of the engine room, and therefore, a structure in which the exhaust gas treatment device is supported by a member other than the engine or the engine accessory has not been employed.

SUMMARY OF THE INVENTION

An object of the present invention is to provide a structure for supporting an exhaust gas treatment device of a working vehicle such that vibration of an engine is not easily transmitted to the exhaust gas treatment device.

To achieve the above-stated object, a working vehicle according to an aspect of the present invention includes: an engine; a vehicle body frame on which the engine is mounted; an exhaust gas treatment device for treating exhaust gas of the engine; and a fixing base for fixing the exhaust gas treatment device, and the fixing base is separated from the engine by a gap. Furthermore, a support body for connecting the fixing base to the vehicle body frame is also separated from the engine by a gap. A bellows pipe for absorbing solid-borne sound is provided in a connection area where a suction pipe of the exhaust gas treatment device is connected to an exhaust manifold of the engine.

With this configuration, the exhaust gas treatment device is coupled to the engine serving as a vibration source via the vehicle body frame, the support body, and the fixing base, and accordingly, the vibration from the engine reaches the exhaust gas treatment device only after propagating through these three members. In particular, since the vibration propagation path includes the highly rigid vehicle body frame that is not very likely to resonate, the vibration that ultimately occurs on the exhaust gas treatment device is lower than that in the conventional structure. Furthermore, a passage for sending exhaust gas from the engine to the exhaust gas treatment device necessarily exists between the engine and the exhaust gas treatment device, and therefore, the vibration of the engine reaches the exhaust gas treatment device after passing through this passage. This additional vibration propagation (solid-borne sound) is attenuated due to absorption by the bellows pipe provided in the connection area where the suction pipe of the exhaust gas treatment device is connected to the exhaust manifold of the engine.

Depending on the working vehicle, the vehicle body frame includes an engine mounting frame and a mission case that is connected to a rear part of the engine mounting frame. In this case, the configuration of the support body may be one selected from the configuration in which it is fixed to the engine mounting frame and the configuration in which it is fixed to the mission case, in accordance with conditions such as an installation space.

In the case where the exhaust gas treatment device is disposed above the engine, the fixing base will also be located above a rear part of the engine. In this embodiment, the support body formed as a columnar body is convenient. In this case, it is preferable to prepare a first columnar member standing up from the vehicle body frame along one side face of the engine, and a second columnar member standing up from the vehicle body frame along another side face of the engine. With this configuration, a gate-shaped frame is built by the first columnar member, the second columnar member, and the fixing base, and a high rigidity can be expected.

In one preferable embodiment of the present invention, the suction pipe includes an upper pipe portion extending from a portion below a transverse cross-sectional center of the exhaust gas treatment device and being bent obliquely downward at an obtuse angle, and a lower pipe portion forming the connection area, and a depression angle of a pipe axis of the lower pipe portion relative to the exhaust gas treatment device is larger than that of the upper pipe portion. With this configuration, an ample free space between the exhaust gas treatment device and the suction pipe is obtained, compared with a case of employing a right-angle elbow pipe as the suction pipe of the exhaust gas treatment device, and it becomes easy to attach the exhaust gas treatment device itself and to attach other engine devices.

If the bellows pipe is installed between the upper pipe portion and the lower pipe portion, the bellows pipe can absorb the vibration from the engine, and further absorb a position shift between the exhaust portion and the suction pipe at the time of connecting the suction pipe of the exhaust gas treatment device to the exhaust portion of the exhaust manifold, by means of bellows of the bellows pipe.

In one preferable embodiment of the present invention, the lower pipe portion is provided with an upper flange, and a terminal of the exhaust manifold is provided with a lower flange connected to the upper flange so as to align a face of the lower flange with a face of the upper flange such that gas can flow. More preferably, a coupling face between the upper flange and the lower flange is an inclined face, and the inclined face is inclined such that a portion thereof close to the exhaust gas treatment device is at a lower position. The flange coupling face formed as an inclined face will function as a guide face during a work of installing the exhaust gas treatment device, which is convenient.

DETAILED DESCRIPTION OF THE PREFERRED EMBODIMENTS

Embodiments of the present invention will be described below based on the drawings, using a tractor as an exemplary working vehicle according to the present invention.

Figure 1:
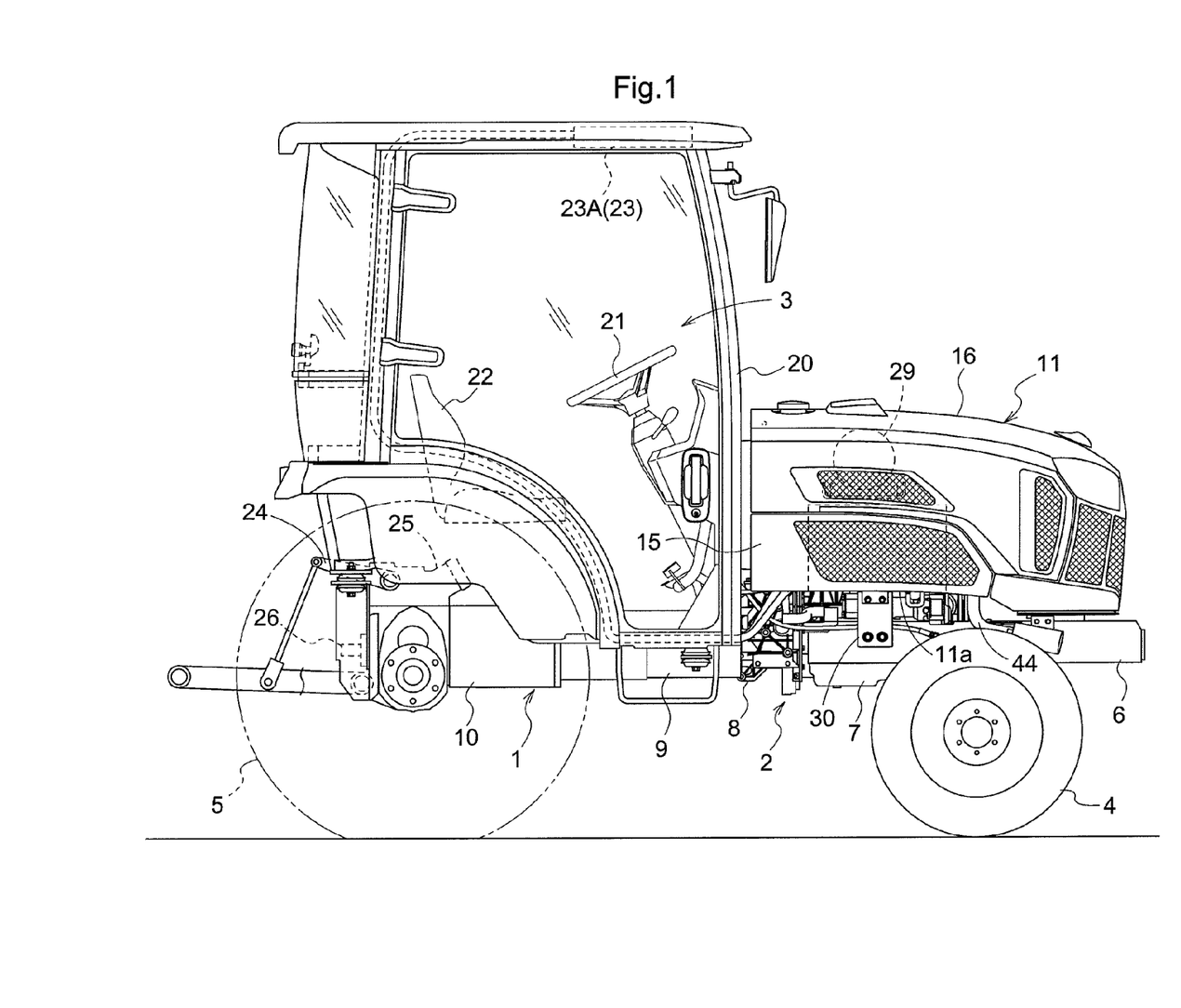
FIG. 1 is a right side view of a tractor.

As shown in FIG. 1, the tractor described as an example in the present embodiment includes a motor portion 2 in the front half of a vehicle body frame 1, and a driving section 3 is formed in the rear half of the vehicle body frame 1. This tractor is a four-wheel drive vehicle and provided with front wheels 4 serving as steered wheels that can be driven on the left and right sides of the motor portion 2, and rear wheels 5 serving as drive wheels that can be controlled on the left and right sides of the driving section 3.

The vehicle body frame 1 includes an engine frame 6, a middle frame 9, and a transmission case 10. A water-cooled diesel engine (hereinafter referred to as an "engine") 7 is mounted at the rear end of the engine frame 6. A clutch housing 8 is coupled to the lower rear part of the engine 7, and the transmission case (hereinafter referred to as a "T/M case") 10 is coupled to the rear part of the clutch housing 8 via the middle frame 9. The engine frame 6 includes a pair of left and right plate members, one of which will be referred to as a first engine frame 6 and the other will be referred to as a second engine frame 6. These plate members will be collectively referred to as the engine frame 6 unless they need to be particularly distinguished.

As shown in FIGS. 1 to 5, the motor portion 2 includes an engine room 12 formed by a hood 11 disposed in the front half of the vehicle body frame 1. In this engine room 12, a radiator 13, an air cleaner 14, and the like, which are peripheral equipment of the engine 7, are accommodated together with the engine 7.

The hood 11 includes a pair of left and right side covers 15 that cover the sides of the engine 7 and the like, and an upper cover 16 that can be opened and closed and covers the engine 7 and the like from above. The left and right side covers 15 are mounted in a detachable manner respectively on the left and right sides of the engine 7 via a first support frame 17 that has an inverted U-shape and is installed on the clutch housing 8 in a standing manner, and the like. The upper cover 16 is coupled to the upper end of the first support frame 17 using a pair of left and right coupling portions 18 and a pair of left and right connecting pins 19 that are provided in the upper part of the rear end of the upper cover 16. Thus, the upper cover 16 can pivot in the up-down direction so as to be opened and closed between a closed position at which it covers the motor portion 2 from above and an opened position at which it releases the motor portion 2, around the left and right connecting pins 19 serving as a pivoting fulcrum.

As shown in FIG. 1, the driving section 3 includes a passenger space that is demarcated by a cabin 20 mounted on the vehicle body frame 1 in a vibration-proofing manner. In the passenger space, a steering wheel 21 for steering the front wheels, a driver seat 22, and the like are disposed. A ceiling portion of the cabin 20 is equipped with an indoor unit 23A of an air-conditioning device 23.

In the rear part of the T/M case 10, a pair of left and right lifting arms 24 that enable an elevating operation of a working machine (not shown), such as a rotary cultivation machine or a plow that is coupled to the rear part of the tractor, a hydraulic lift cylinder 25 that drives the left and right lifting arms 24 in the up-down direction to pivot, a PTO shaft 26, and the like are disposed. The PTO shaft 26 powers a driven-type working machine, such as a rotary cultivation machine that is coupled to the rear part of the tractor.

Figure 2:
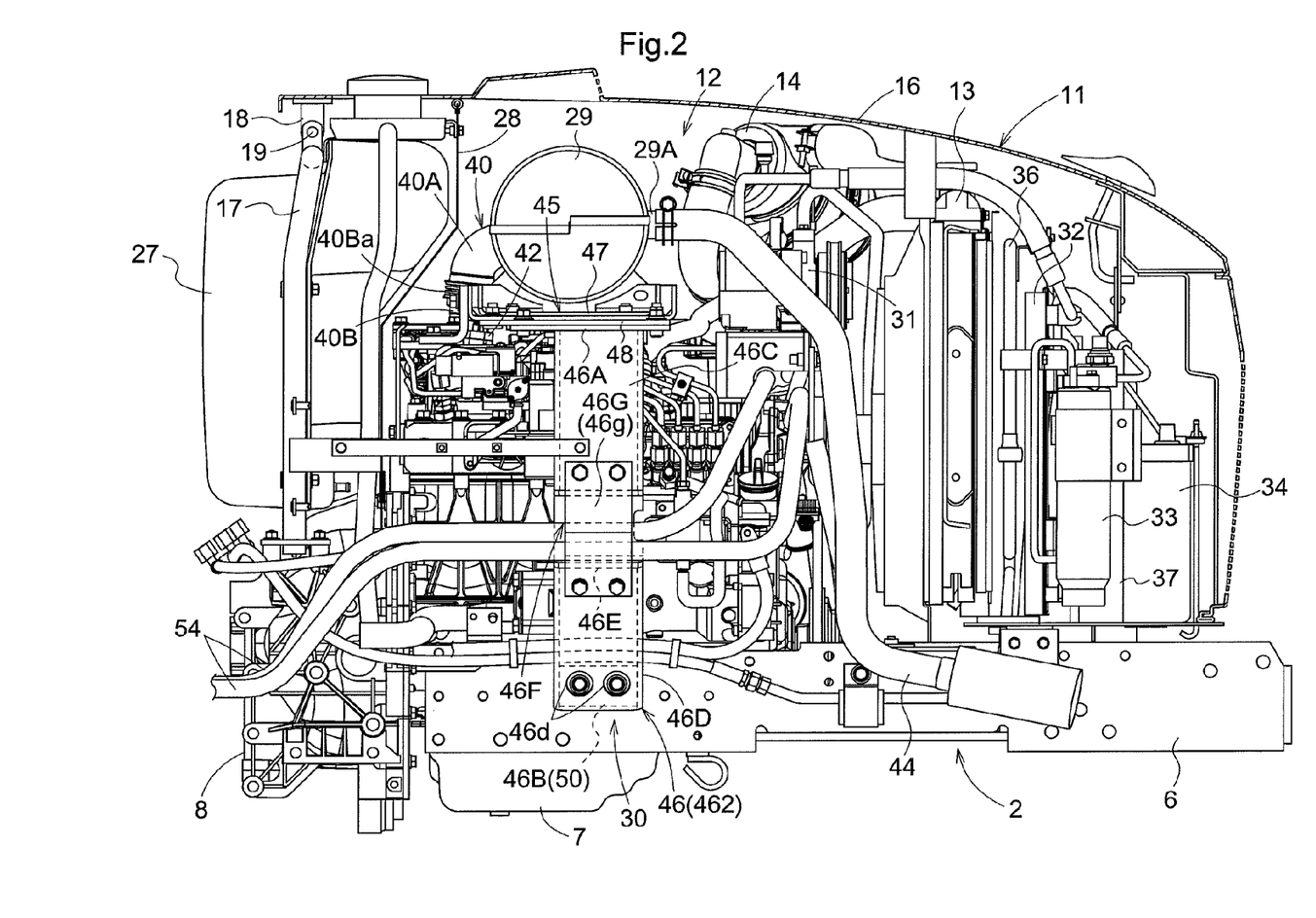
FIG. 2 is a vertical cross-sectional view of the right side of a motor portion.
Figure 3:
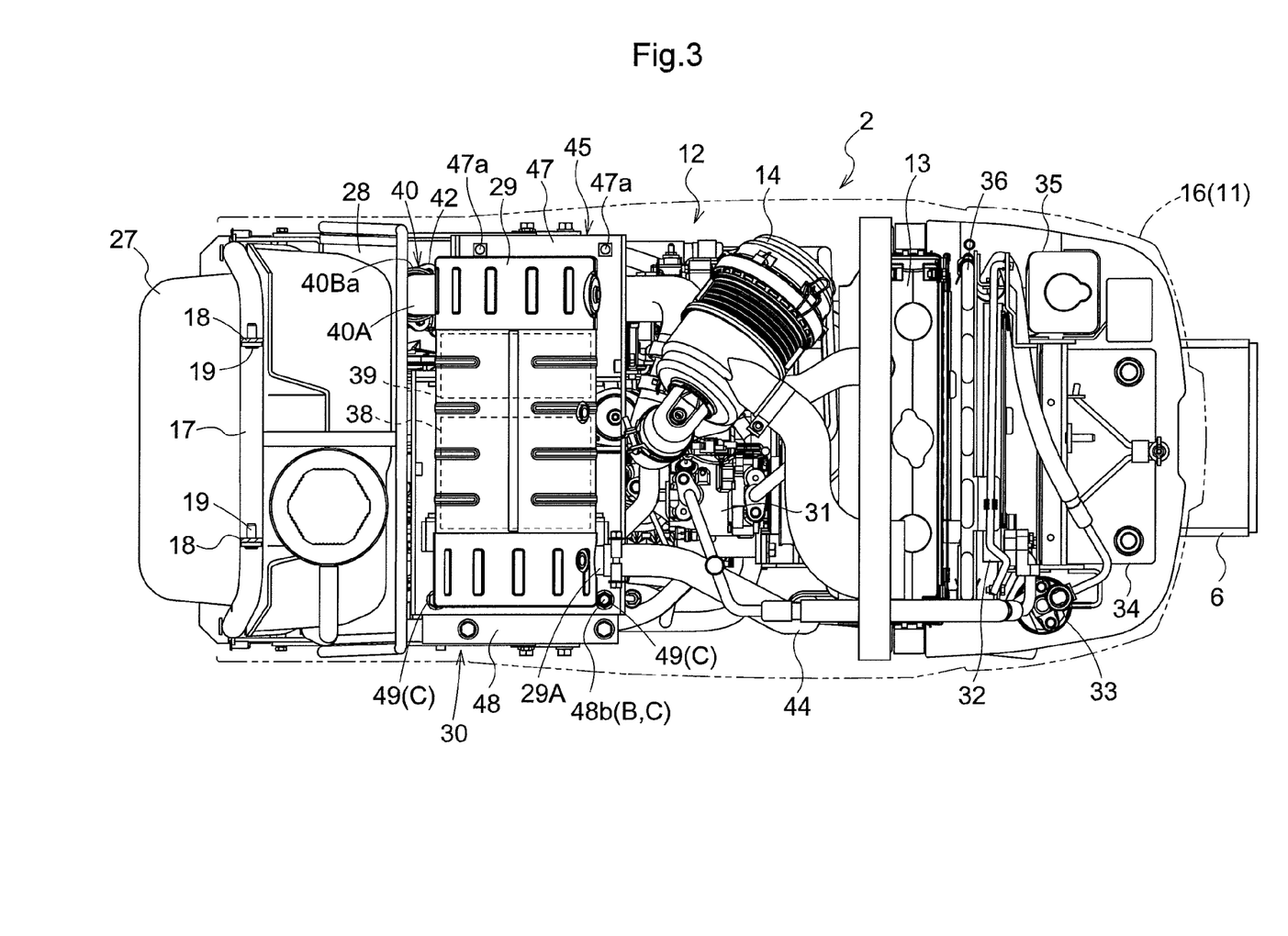
FIG. 3 is a plan view of the motor portion.
Figure 4:
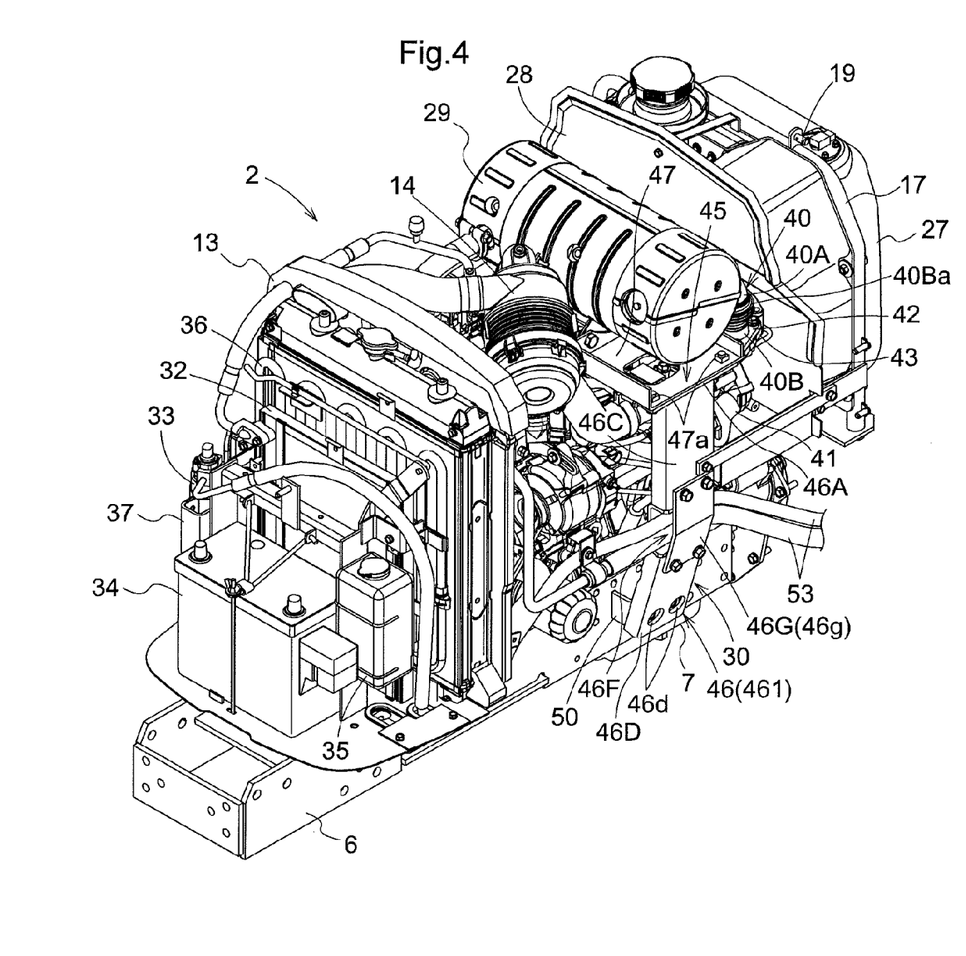
FIG. 4 is a perspective view of the motor portion.

As shown in FIGS. 2 to 4, the first support frame 17 supports a resin fuel tank 27 that is disposed in the vicinity of the rear side of the engine 7, a partition 28 that is disposed between the engine 7 and the fuel tank 27 so as to divide the engine room 12 into an engine side and a fuel tank side, and the like.

As shown in FIGS. 1 to 7, the second support frame 30, which supports a cylindrical exhaust gas purification device 29 that is disposed above the engine 7 and serves as an exhaust gas treatment device 29, is installed in the rear part of the engine frame 6 in a standing manner. A third support frame 37, which supports a compressor 31, a capacitor 32, and a receiver 33 that constitute an outdoor unit 23B of the air-conditioning device 23, as well as a battery 34, a reserve tank 35, an oil cooler 36, and the like, is installed in the front part of the engine frame 6 in a standing manner.

Figure 5:
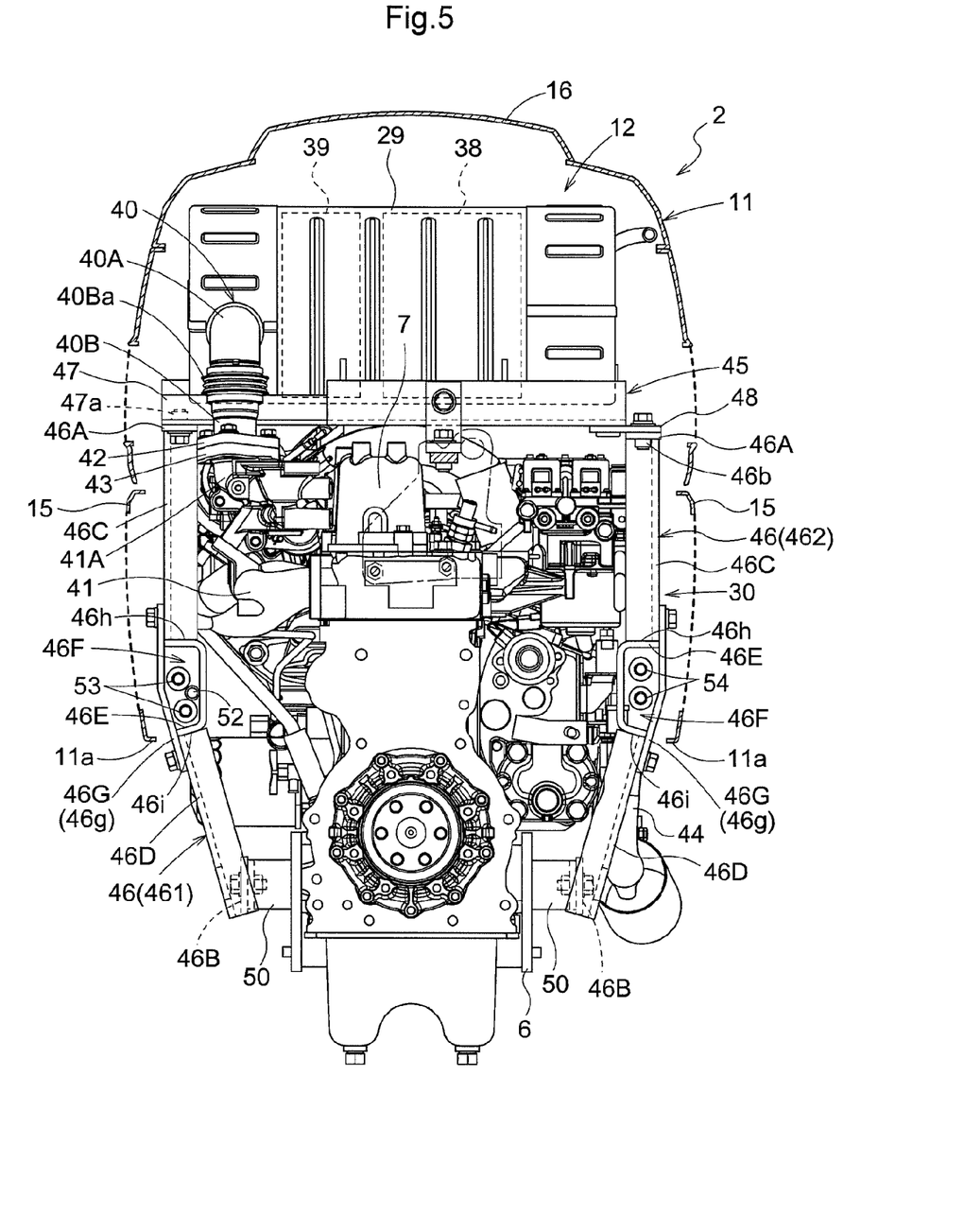
FIG. 5 is a vertical cross-sectional view of the back side of the motor portion.
Figure 6:
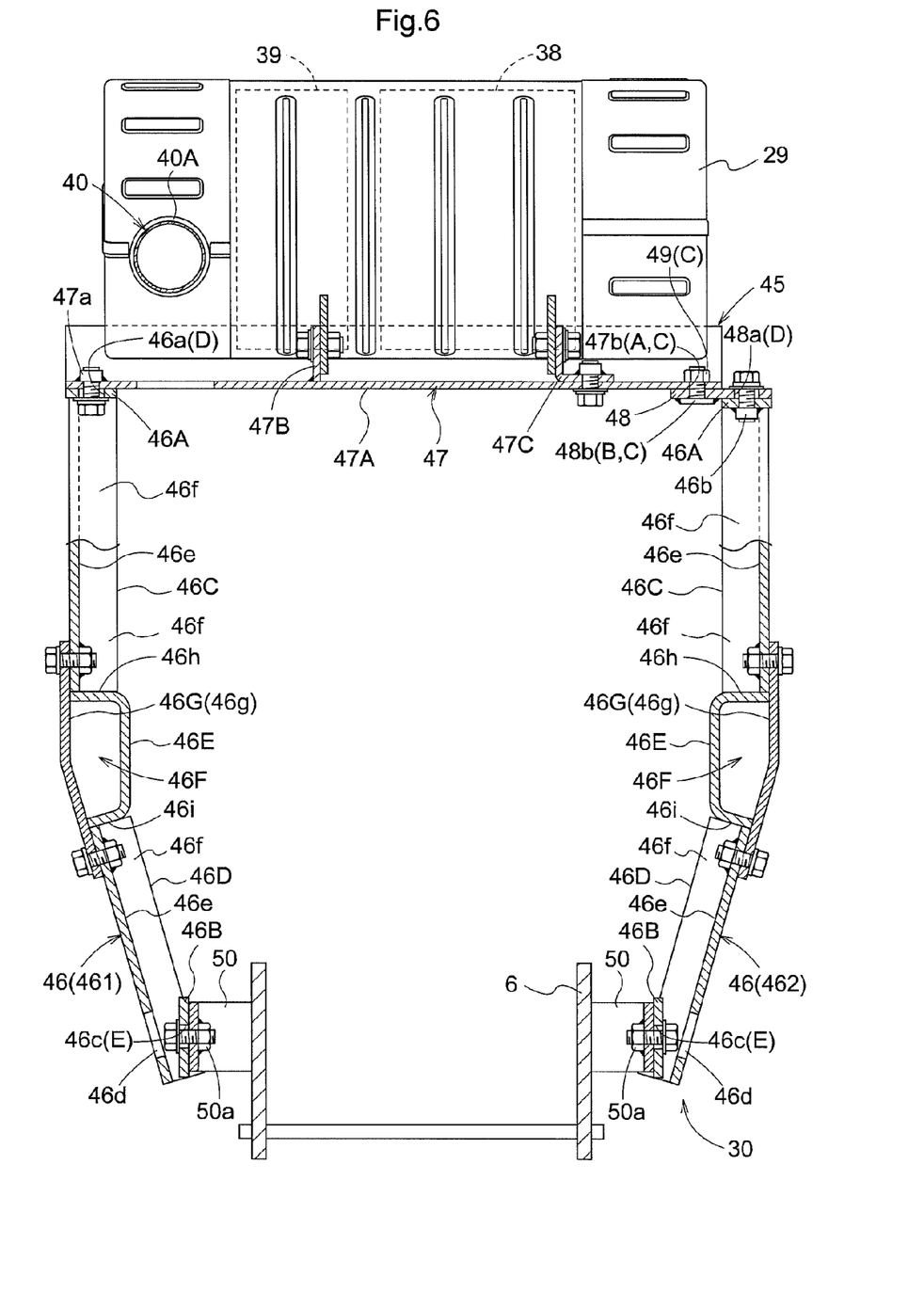
FIG. 6 is a vertical cross-sectional view of the back side of a principal part showing a support structure of an exhaust gas treatment device.

As shown in FIGS. 3, 5, and 6, the exhaust gas purification device 29 includes a DPF (Diesel Particulate Filter) 38 on the inside thereof, and the DPF 38 collects particulate matter contained in exhaust gas of the engine 7 and removes it from exhaust gas. An oxidation catalyst 39 is disposed on the upstream side in the exhaust direction of the DPF 38 inside the exhaust gas purification device 29. The oxidization capability of nitrogen dioxide generated by the oxidation catalyst 39 is used to burn the particulate matter collected by the DPF 38 at a relatively low temperature and remove it. With this configuration, the DPF 38 can be continuously regenerated.

As shown in FIGS. 2 to 8 and 10, the exhaust gas purification device 29 is disposed with its longitudinal direction being parallel to the left-right direction (vehicle cross-sectional direction) so as to face the left and right sides, that is to say, such that the oxidation catalyst 39 on the upstream side in the exhaust direction is located on the left side of the vehicle body and the DPF 38 on the downstream side in the exhaust direction is located on the right side of the vehicle body. The exhaust gas purification device 29 is located above the engine 7 and between the air cleaner 14 and the fuel tank 27. The left end of the exhaust gas purification device 29 is provided with a suction pipe 40 that extends from the rear part of the exhaust gas purification device 29 toward the lower rear side. The suction pipe 40 is connected to an exhaust portion 41A of an exhaust manifold 41 that is disposed on the upper left part of the engine 7. The connection between the suction pipe 40 and the exhaust portion 41A is realized by aligning a face of an upper flange 42 that has an equilateral triangular shape and is provided at an extended end of the suction pipe 40 with a face of a lower flange 43 that has an equilateral triangular shape and is provided as a connecting portion for exhaust of the exhaust portion 41A, and bolting the upper flange 42 with the lower flange 43. The bolt-coupling between the flanges 42 and 43 is performed using three round holes 42a bored at included-angle portions of the flange 42 of the suction pipe 40, and three weld bolts 43a installed in a standing manner at included-angle portions of the flange 43 of the exhaust portion 41A. The right end of the exhaust gas purification device 29 is provided with an exhaust pipe connecting portion 29A that extends frontward from the front end of the exhaust gas purification device 29, and an exhaust pipe 44 is connected to the exhaust pipe connecting portion 29A. The exhaust pipe 44 extends from the exhaust pipe connecting portion 29A toward a part on the right side of the engine frame 6, and the extended end of the exhaust pipe 44 is located below the third support frame 37.

Figure 11:
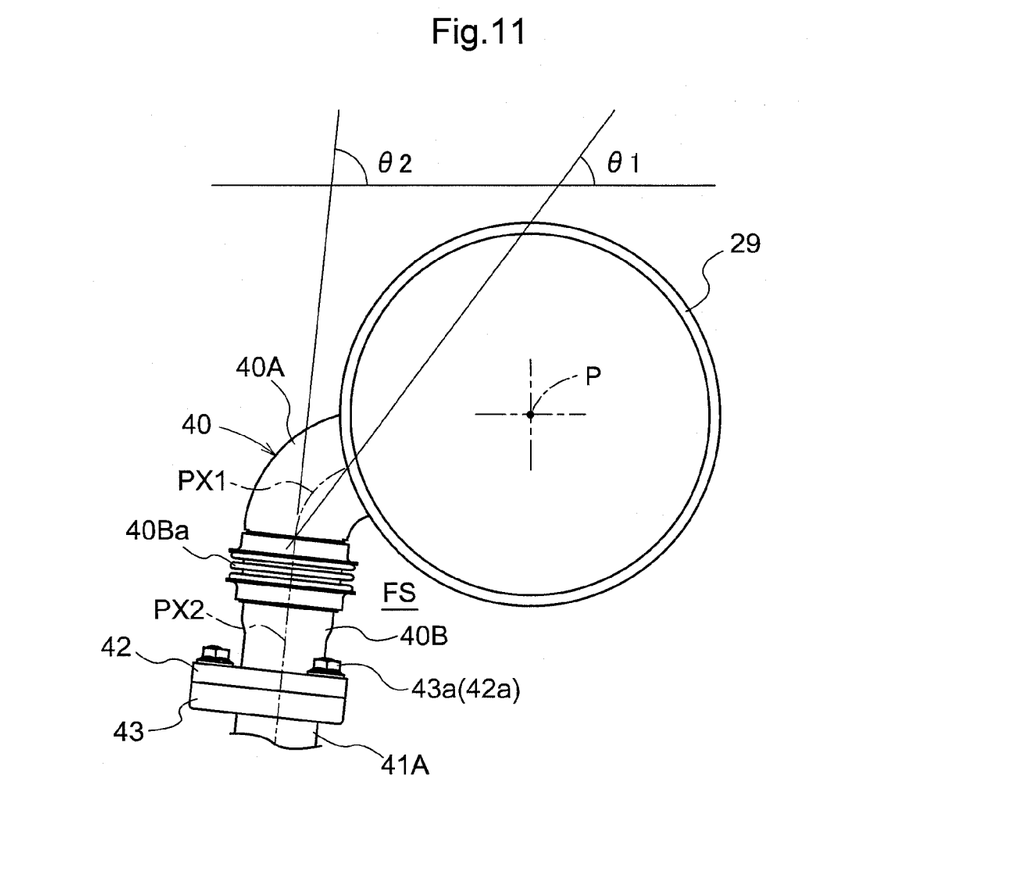
FIG. 11 is an exploded perspective view of the principal part showing the configuration related to installation of the exhaust gas treatment device.

As shown in FIGS. 2, 5, 7, 8, 10, and 11, the suction pipe 40 includes an upper pipe portion 40A, a lower pipe portion 40B, and a bellows portion 40Ba. The upper pipe portion 40A extends at a downward-inclined orientation toward the lower rear side from the rear part of the left end of the exhaust gas purification device 29. An end of the bellows portion 40Ba is connected to the upper pipe portion 40A, and the other end of the bellows portion 40Ba is connected to the lower pipe portion 40B. The bellows portion 40Ba may be formed as a part of the upper pipe portion 40A and/or the lower pipe portion 40B. The upper pipe portion 40A is formed as a bent pipe that extends from a portion below the transverse cross-sectional center of the exhaust gas purification device 29 and is bent obliquely downward at an obtuse angle. In FIG. 11, the average angle of its downward inclination relative to the exhaust gas purification device 29 is denoted by θ1. The lower pipe portion 40B is formed as a straight pipe, and the angle of its downward inclination relative to the exhaust gas purification device 29 is denoted by θ2. In this embodiment, θ2 is set to be larger than θ1, and the suction pipe 40 produces a free space FS between the suction pipe 40 and the exhaust gas purification device 29 while shortening a gap from the exhaust gas purification device 29 in the vehicle longitudinal direction.

With this configuration, the extension of the bent portion of the suction pipe 40 toward the upper rear side can be further suppressed without bringing the flange 42 provided at the extended end of the suction pipe 40 close to the exhaust gas purification device 29, in comparison with in a case where, for example, the suction pipe 40 is formed so as to be bent at a right angle and thus have a horizontal upper pipe portion and a vertical lower pipe portion. Therefore, owing to the suppression of the extension of the suction pipe 40, it is possible in this tractor to cause the fuel tank 27 disposed on the rear side of the engine 7 and the exhaust gas purification device 29 to protrude, at its upper side located on the rear side of the exhaust gas purification device 29, toward the exhaust gas purification device 29, and is possible to dispose the fuel tank 27 close to the exhaust gas purification device 29.

As a result, the fuel tank 27, which is part of the peripheral equipment of the engine 7, is installed in a compact state in which the fuel tank 27 is brought close to the rear side of the engine 7 while an increase in the capacity of the fuel tank 27 is achieved, without causing inconveniences such as difficulty in connecting the flange 43 on the exhaust manifold side to the flange 42 on the exhaust gas purification device side due to the flange 42 provided at the extended end of the suction pipe 40 being disposed close to the exhaust gas purification device 29, and without causing inconveniences such as a higher installation height of the exhaust gas purification device 29 installed above the engine 7 and a higher height of the hood 11 covering the engine 7 and the exhaust gas purification device 29 due to extending length of downward extension of the suction pipe 40 for facilitating this connection.

Further, the overall length of the suction pipe 40 can be shortened by forming the suction pipe 40 so as to be bent at an obtuse angle, compared with a case where, for example, the suction pipe 40 is formed so as to be bent at a right angle. With this configuration, heat energy loss can be suppressed when exhaust gas is supplied from the exhaust manifold 41 to the DPF 38 of the exhaust gas purification device 29, and removal of particulate matter collected by the DPF 38 by combustion is facilitated.

As a result, the DPF 38 can be desirably regenerated, and particulate matter contained in exhaust gas of the diesel engine can be efficiently removed.

As shown in FIGS. 5, 6, and 8 to 10, the upper flange 42 on the exhaust gas purification device side and the lower flange 43 on the exhaust manifold side, which are each formed in an equilateral triangular shape, are provided on the suction pipe 40 of the exhaust gas purification device 29 or the exhaust portion 41A of the exhaust manifold 41 in a state where the orientation of one side of the upper and lower flanges 42 and 43 is set to form their front end on the exhaust gas purification device side.

With this configuration, bolt-coupling between the upper flange 42 and the lower flange 43 is facilitated.

Figure 7:
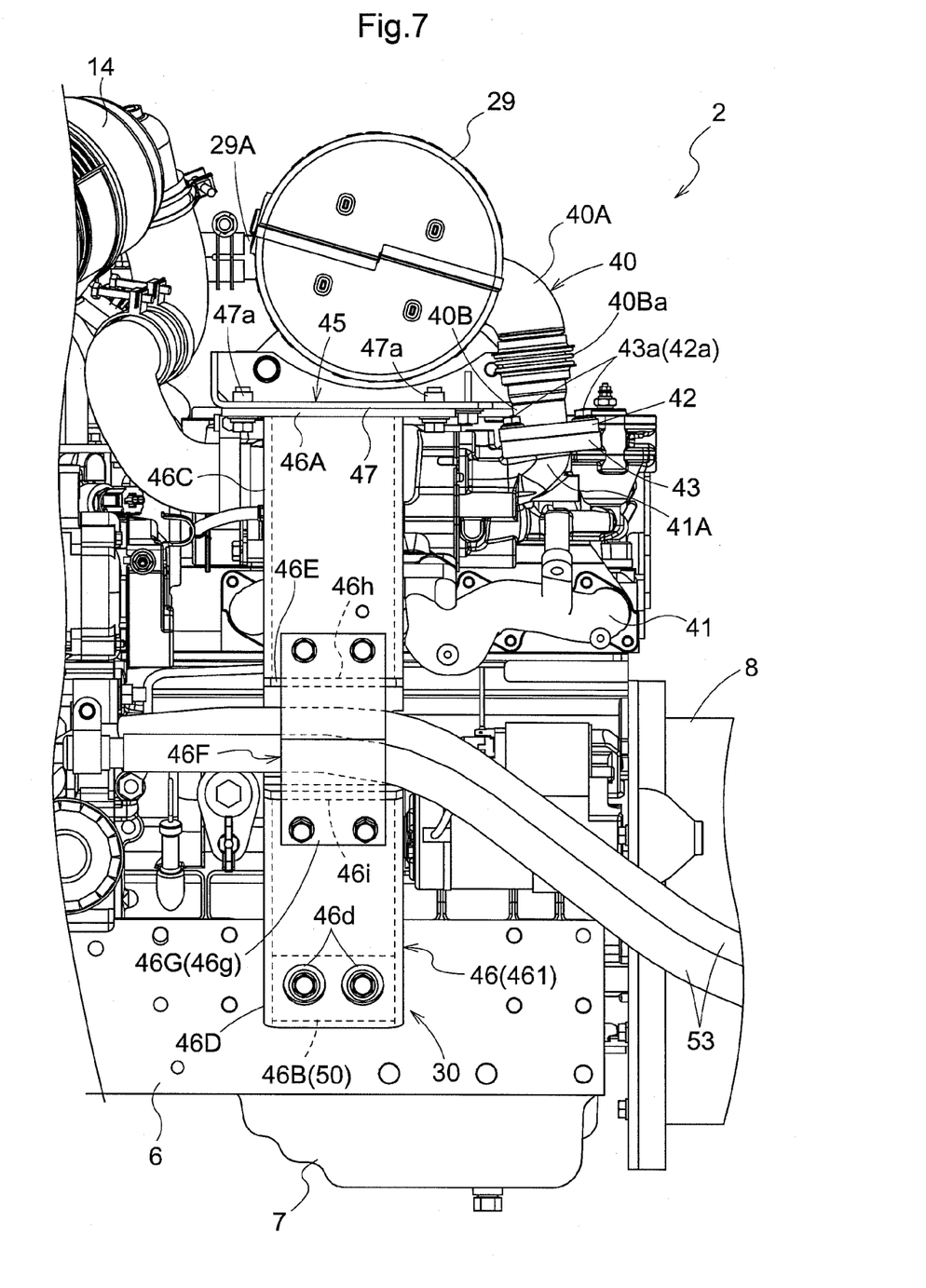
FIG. 7 is a vertical cross-sectional view of the left side of the principal part showing the support structure of the exhaust gas treatment device.
Figure 8:
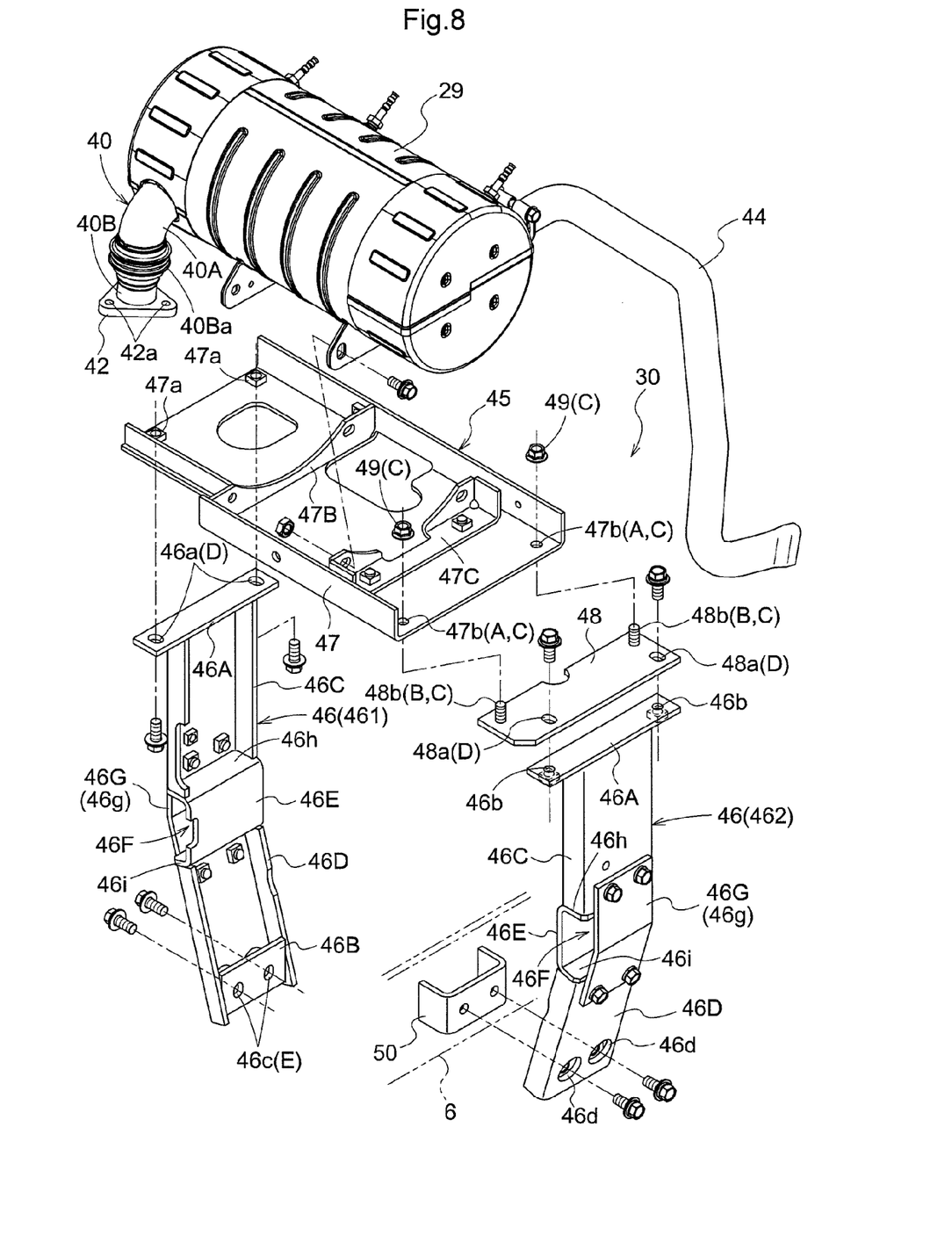
FIG. 8 is an exploded perspective view of the principal part showing the support structure of the exhaust gas treatment device.

As shown in FIGS. 2 and 7, the coupling face of the upper flange 42 and the lower flange 43 is set at a rear-raised orientation at which the coupling face is inclined toward the exhaust gas purification device side so as to extend toward the exhaust gas purification device 29.

That is to say, the coupling face of the upper flange 42 and the lower flange 43 is an inclined face, and this inclined face is inclined such that a portion close to the exhaust gas purification device 29 is at a lower position.

This configuration further facilitates bolt-coupling between the upper flange 42 and the lower flange 43.

As shown in FIGS. 2 to 5, 7, and 8 to 10, the suction pipe 40 includes the bellows portion 40Ba. With this configuration, a position shift between the flange 42 on the suction pipe side and the flange 43 on the exhaust manifold side at the time of connecting the flange 42 on the suction pipe side to the flange 43 on the exhaust manifold side can be absorbed by the bellows portion 40Ba. Further, vibration of the engine 7 is absorbed by the bellows portion 40Ba, propagation of the vibration to the exhaust gas purification device 29 reduces, and vibrating movement of the exhaust gas purification device 29 caused by the vibration of the engine 7 is suppressed.

As shown in FIGS. 2 to 10, the second support frame 30 includes a stage unit 45 on which the exhaust gas purification device 29 is placed, and a support body 46 for receiving and supporting the stage unit 45 from below. In this embodiment, the support body 46 includes a first column 461 and a second column 462 that are fixed respectively to the rear parts of the first engine frame 6 and the second engine frame 6 that constitute the engine frame 6. The stage unit 45 is installed so as to span from the upper end of the first column 461 to the upper end of the second column 462. That is to say, the second support frame 30 is formed as an overall gate-shaped frame that spans across the engine 7 in the left-right direction. Note that the first column 461 and the second column 462 have substantially the same shape and the same function, and will be referred to simply as the column 46 unless they need to be particularly distinguished.

With this configuration, the exhaust gas purification device 29 that is large and heavy due to provision of the DPF 38, the oxidation catalyst 39, and the like can be stably supported in a state of being separate from the engine 7 by the firm second support frame 30 that substantially has a gate-shape.

Since the exhaust gas purification device 29 is not supported by the engine 7, inconveniences such as the weight of the heavy exhaust gas purification device 29 being applied to the engine 7, the large and heavy exhaust gas purification device 29 vibrating integrally with the engine 7, and the like are eliminated. As a result, it is possible to reduce the possibility of causing damage to the exhaust gas purification device 29 or the like caused by the vibration of the engine 7, loosening of the coupling portions involved in support of the engine 7 and the exhaust gas purification device 29, or the like.

As shown in FIGS. 2 to 8 and 10, the stage unit 45 has a two-division structure, that is to say, the stage unit 45 can be divided into a fixing base 47 to which the exhaust gas purification device 29 is coupled with bolts, and a coupling portion 48 that is made of a metal plate and couples the right end of the fixing base 47 to the upper end of the second column 462 on the right side. The fixing base 47 includes a base plate 47A that is made of a metal plate and formed to be bent in a U-shape as viewed from the side, and this base plate 47A has left and right coupling members 47B and 47C for bolt-coupling to the exhaust gas purification device 29, and the like. The base plate 47A has, in two (front and rear) parts of its left end, bolt-coupling portions 47a, each of which includes weld nuts that enable bolt-coupling to the upper end of the left column 46, and the like. In two (front and rear) parts of the right end of the base plate 47A, round holes 47b serving as engaging portions A to engage with the coupling portion 48 are bored. In two (front and rear) parts of the right end of the coupling portion 48, elongated holes 48a that are elongated in the left-right direction and enable bolt-coupling to the upper end of the left column 46 are bored. Further, in two (front and rear) parts of the left end of the coupling portion 48, weld bolts 48b serving as engaged portions B to engage with the fixing base 47 are provided in a standing manner.

The two (front and rear) round holes 47b bored in the fixing base 47 and the two (front and rear) weld bolts 48b installed on the coupling portion 48 in a standing manner are configured such that the positioning of the fixing base 47 in the lateral direction (horizontal direction) relative to the coupling portion 48 is performed by means of engagement therebetween. After the positioning, the fixing base 47 is fixed to the coupling portion 48 by the nuts 49 being screwed onto the respective weld bolts 48b.

That is to say, a coupling mechanism C for fixing the fixing base 47 to the coupling portion 48 includes the two (front and rear) round holes 47b of the fixing base 47, the front and rear weld bolts 48b of the coupling portion 48, and the two nuts 49 that are screwed with the weld bolts 48b.

As shown in FIGS. 2 and 4 to 10, a support plate 46A for receiving and supporting the stage unit 45 from below is welded at the upper end of each column 46 at an orientation at which the longitudinal direction of the support plate 46A is parallel to the front-rear direction. Elongated holes 46a that are elongated in the left-right direction and enable bolt-coupling to the fixing base 47 are bored in two (front and rear) parts of the left support plate 46A. Each elongated hole 46a has a larger diameter than that of a screw hole of the corresponding bolt-coupling portion 47a of the fixing base 47. The right support plate 46A has, in two (front and rear) parts thereof, bolt-coupling portions 46b each including a weld nut that enables bolt-coupling to the coupling portion 48, and the like. The elongated holes 48a of the coupling portion 48 that correspond to each bolt-coupling portion 46b have a larger diameter than that of a screw hole of the bolt-coupling portion 46b.

That is to say, in the second support frame 30, the two (front and rear) elongated holes 46a bored in the support plate 46A of the left column 46, and the two (front and rear) elongated holes 48a provided in the coupling portion 48 of the stage unit 45 constitute, due to having leeway with respect to the screw holes of the corresponding bolt-coupling portions 47a and 46b, a lateral adjustment mechanism D that enables position adjustment of the exhaust gas purification device 29 in the lateral direction (horizontal direction) relative to the engine 7, between the stage unit 45 and the left and right columns 46.

On the other hand, coupling plates 46B, which are coupled with bolts to left and right brackets 50 installed so as to project outward in the lateral direction in the rear part of the engine frame 6, are welded onto the lower end of the respective columns 46. Elongated holes 46c that are elongated in the up-down direction and enable bolt-coupling to the corresponding brackets 50 are bored in two (front and rear) parts of each coupling plate 46B. Each bracket 50 has, in two (front and rear) parts thereof, bolt-coupling portions 50a each including a weld nut that enables bolt-coupling to the corresponding coupling plate 46B, and the like. A tool insertion hole 46d having a circular shape with a large diameter is bored in a part of each column 46 facing the elongated hole 46c.

With this configuration, on the second support frame 30, the two (front and rear) elongated holes 46c bored in the brackets 50 constitute a vertical adjustment mechanism E that enables position adjustment of the exhaust gas purification device 29 in the vertical direction relative to the engine 7, between the engine frame 6 and the left and right columns 46.

That is to say, since the second support frame 30 in this tractor includes the lateral adjustment mechanism D and the vertical adjustment mechanism E, the positioning of the exhaust gas purification device 29 relative to the engine 7 can be easily performed, even though it is supported by the second support frame 30 in a state of being separate from the engine 7, as described above. In other words, when the exhaust gas purification device 29 is installed, even if a position shift occurs between the flange 43 serving as a connecting portion for exhaust provided on the engine 7 and the flange 42 provided on the suction pipe 40 serving as a suctioning portion of the exhaust gas purification device 29, the positioning in the lateral direction (horizontal direction) and in the vertical direction between the flange 43 on the engine side and the flange 42 on the exhaust gas purification device side can be easily performed by the lateral adjustment mechanism D and the vertical adjustment mechanism E.

Since the flange 43 on the engine side and the flange 42 on the exhaust gas purification device side can be easily and appropriately connected, it is possible to avoid possible damage to the bellows portion 40Ba or the like due to a stress concentrating on the bellows portion 40Ba provided on the suction pipe 40 of the exhaust gas purification device 29, for example, resulting from inappropriate connection between the flange 43 on the engine side and the flange 42 on the exhaust gas purification device side.

Figure 9:
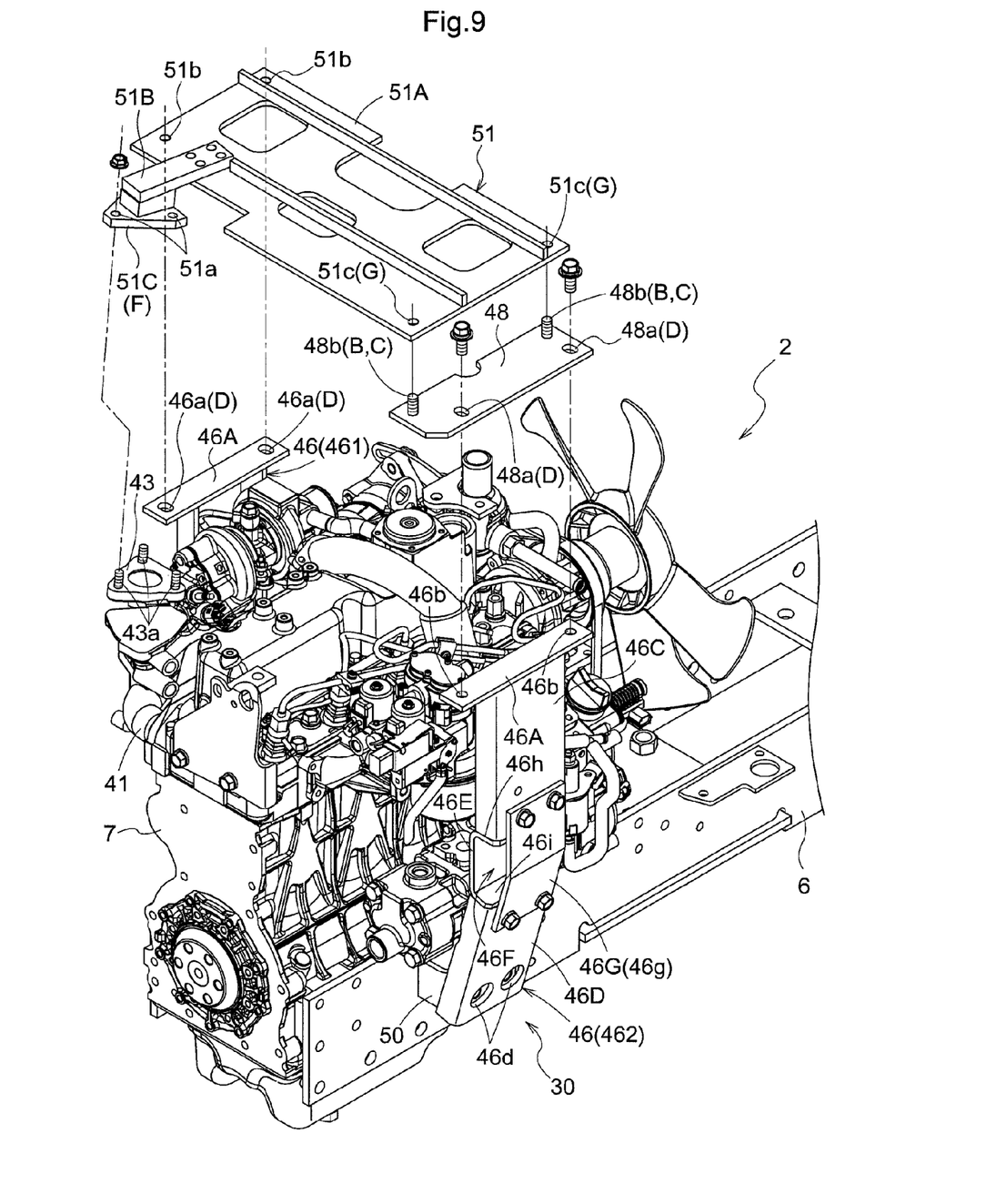
FIG. 9 is an exploded perspective view of a principal part showing a configuration related to installation of the exhaust gas treatment device using a jig.
Figure 10:
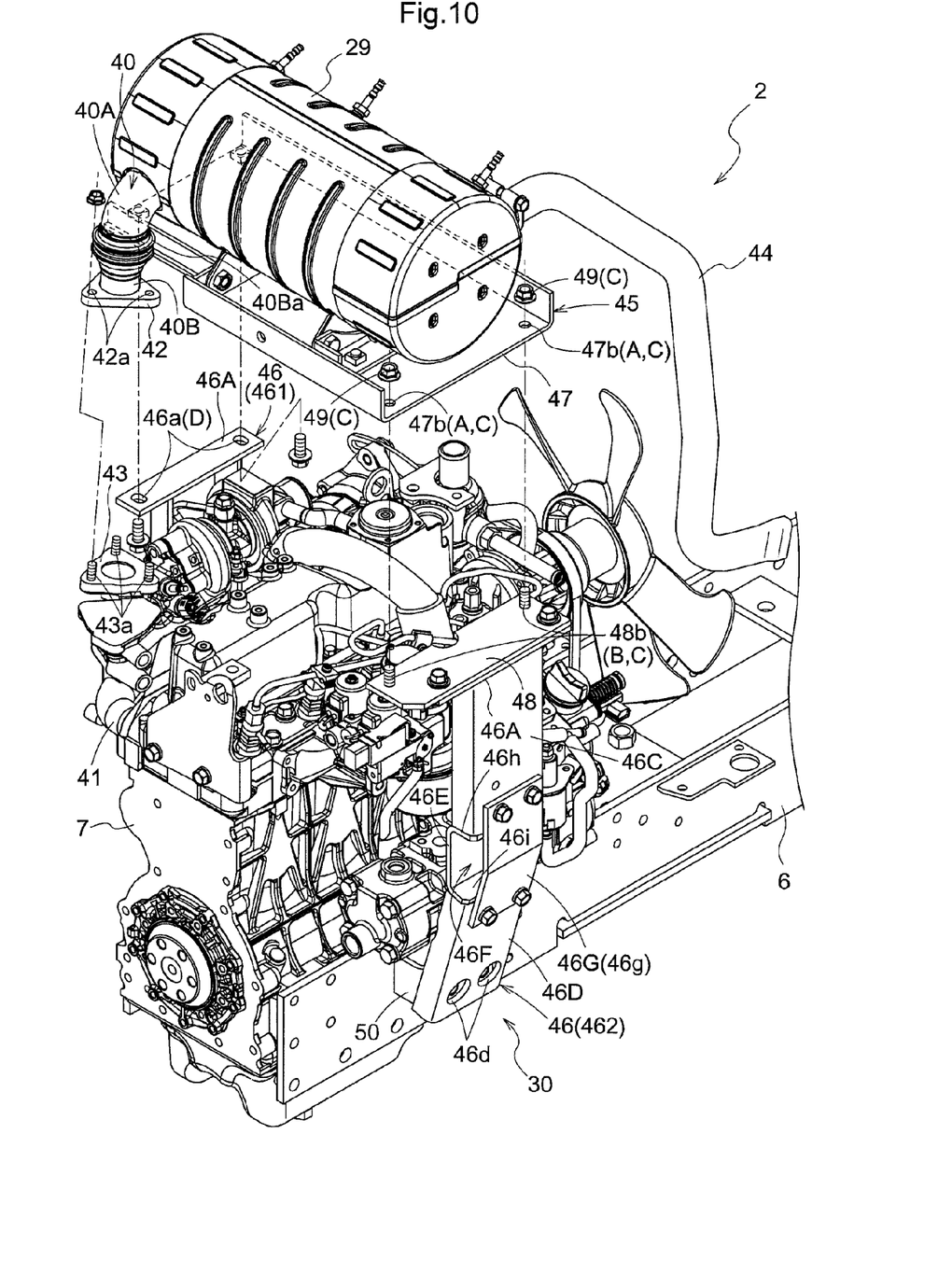
FIG. 10 is an exploded perspective view of a principal part showing a configuration related to installation of the exhaust gas treatment device.

As shown in FIG. 9, when the exhaust gas purification device 29 is installed, position adjustment of the exhaust gas purification device 29 relative to the engine 7 is performed using a jig 51 in place of the fixing base 47 on which the exhaust gas purification device 29 is mounted.

This jig 51 has a positioning flange 51C in an equilateral triangular shape, which corresponds to the flange 42 on the exhaust gas purification device side, in the left rear part of a metal plate member 51A, which corresponds to the fixing base 47 of the stage unit 45, via a support arm 51B. Positioning round holes 51a, in which the weld bolts 43a installed on the flange 43 on the engine side in a standing manner are allowed to be inserted, are bored at included-angle portions of the positioning flange 51C. Further, positioning round holes 51b, which serve in place of the bolt-coupling portions 47a of the fixing base 47, are bored in two (front and rear) parts of the left end of the metal plate member 51A. Furthermore, positioning round holes 51c, which can engage with the two weld bolts 48b of the coupling portion 48 similarly to the round holes 47b of the fixing base 47, are bored in two (front and rear) parts of the right end of the metal plate member 51A. The positional relationship between the three round holes 51a of the positioning flange 51C and the four round holes 51b and 51c of the metal plate member 51A is the same as the positional relationship between the two bolt-coupling portions 47a and two round holes 47b of the fixing base 47 and the three round holes 42a of the flange 42 on the exhaust gas purification device side of the fixing base 47 on which the exhaust gas purification device 29 is mounted in a fixed manner.

That is to say, the positioning flange 51C of the jig 51 functions as a positioning mechanism F for exhaust that can perform positioning relative to the flange 43 serving as the connecting portion for exhaust provided on the engine 7. The two (front and rear) round holes 51c on the right side function as an engaging mechanism G for performing positioning in the lateral direction (horizontal direction) relative to the coupling portion 48 by engaging with the two weld bolts 48b serving as the engaged portions B of the coupling portion 48.

Installation of the exhaust gas purification device 29 will now be described based on FIGS. 6 and 8 to 10. Initially, the left and right columns 46 are temporarily installed on the engine frame 6 using the two (front and rear) bolt-coupling portions 50a provided on the left and right brackets 50 of the engine frame 6, the two (front and rear) elongated holes 46c (vertical adjustment mechanism E) that are provided in the coupling plates 46B of the columns 46 and extend in the up-down direction, and the like. Next, the coupling portion 48 of the stage unit 45 is temporarily installed on the support plate 46A provided at the upper end of the right column 46 using the two (front and rear) bolt-coupling portions 46b provided in the support plate 46A and the two (front and rear) elongated holes 48a (lateral adjustment mechanism D) that are provided in the coupling portion 48 and extend in the left-right direction.

After the above temporal installation, the jig 51 is used in place of the fixing base 47 on which the exhaust gas purification device 29 is mounted. The two (front and rear) round holes 51c (engaging mechanism G) provided at the right end of the jig 51 engage with the two (front and rear) weld bolts 48b provided on the coupling portion 48, and the three round holes 51a provided in the positioning flange 51C engage with the three weld bolts 43a provided on the flange 43 (connecting portion for exhaust) on the engine side. Furthermore, the jig 51 is fixed to the coupling portion 48 and the support plate 46A of the left column 46 such that the two (front and rear) round holes 51b provided at the left end of the jig 51 face the two (front and rear) elongated holes 46a provided in the support plate 46A of the left column 46, using the two (front and rear) elongated holes 48a of the coupling portion 48 and the two (front and rear) elongated holes 46a provided in the support plate 46A of the left column 46.

The positioning in the lateral direction (horizontal direction) of the jig 51 (positioning flange 51C) relative to the engine 7 (flange 43) is thereby performed easily and appropriately.

Next, the position adjustment in the vertical direction of the jig 51 relative to the engine 7 is performed by adjusting the position of the columns 46 in the vertical direction relative to the engine frame 6 using the two (front and rear) elongated holes 46c of the columns 46 such that the flange 43 on the engine side and the positioning flange 51C (positioning mechanism F) of the jig 51 are in a joined state. At the stage where the joined state is achieved, the left and right columns 46 are ultimately fixed to the engine frame 6.

It is thereby possible to appropriately install the left and right columns 46 on the engine frame 6 in a standing manner.

Thereafter, the coupling portion 48 of the stage unit 45 is ultimately fixed to the support plate 46A of the right column 46. It is thereby possible to appropriately install the coupling portion 48 of the stage unit 45 on the right column 46.

Consequently, the jig 51 is disposed at an appropriate position relative to the engine 7 by the left and right columns 46 installed on the engine frame 6 in a standing manner and the coupling portion 48 installed on the right column 46.

Next, the engagement between the three weld bolts 43a provided on the flange 43 on the engine side and the three round holes 51a provided in the positioning flange 51C of the jig 51 is released, and the engagement between the two (front and rear) weld bolts 48b provided on the coupling portion 48 and the two (front and rear) round holes 51c provided at the right end of the jig 51 is released, thus removing the jig 51 from the coupling portion 48. Thereafter, the fixing base 47 on which the exhaust gas purification device 29 is mounted in a fixed manner is fixed to the coupling portion 48 and the support plate 46A of the left column 46. At this time, the two (front and rear) round holes 47b provided at the right end of the fixing base 47 engage with the two (front and rear) weld bolts 48b provided on the coupling portion 48, and the three round holes 42a provided in the flange 42 of the exhaust gas purification device 29 engage with the three weld bolts 43a provided on the flange 43 on the engine side.

Thus, the stage unit 45 on which the exhaust gas purification device 29 is mounted in a fixed manner is appropriately installed so as to span between the left and right columns 46, and the exhaust gas purification device 29 is located at an appropriate position relative to the engine 7. As a result, the flange 42 of the exhaust gas purification device 29 can be accurately joined to the flange 43 on the engine side.

Thereafter, the flange 42 of the exhaust gas purification device 29 is coupled with bolts to the flange 43 on the engine side using the three weld bolts 43a provided on the flange 43 on the engine side. The left end of the fixing base 47 is coupled with bolts to the support plate 46A of the left column 46 using the two (front and rear) elongated holes 46a provided in the support plate 46A of the left column 46 and the two (front and rear) round holes 51b provided at the left end of the fixing base 47. Furthermore, the right end of the fixing base 47 is coupled with the bolts to the coupling portion 48 fixed to the right column 46 using the two (front and rear) weld bolts 48b provided on the coupling portion 48.

It is thereby possible to appropriately install the second support frame 30 for supporting the exhaust gas purification device 29 on the engine frame 6 in a standing manner. With the second support frame 30, the exhaust gas purification device 29 can be supported at an appropriate position relative to the engine 7.

That is to say, it is possible to more easily and appropriately install the second support frame 30 to be installed on the engine frame 6 in a standing manner, support the exhaust gas purification device 29 with the second support frame 30 installed on the engine frame 6 in a standing manner, and connect the flange 43 on the engine side to the flange 42 of the exhaust gas purification device 29, while achieving a reduction in effort needed for these tasks, by using the jig 51 that is more compact, lighter, and easier to handle than the fixing base 47 on which the exhaust gas purification device 29 is mounted in a fixed manner.

The structure of the left and right columns 46 will now be described using FIGS. 2 and 4 to 10. An upper column member 46C and a lower column member 46D are welded in a state of being connected vertically via a relay member 46E. In a state of being fixed to the engine frame 6, the lower column member 46D coupled to the engine frame 6 is at an inclined orientation at which it is inclined outward in the lateral direction of the vehicle, and the upper column member 46C is at a vertical orientation. That is to say, the upper column member 46C is bent inward of the vehicle relative to the lower column member 46D.

Thus, the horizontal width of the space that is secured above the engine frame 6 and where the engine 7 and the exhaust gas purification device 29 are disposed becomes longer. It is thereby possible to dispose a large exhaust gas purification device 29.

As shown in FIGS. 2 and 4 to 10, the column members 46C and 46D are each made of groove-shaped steel material having a first vertical wall portion 46e and a second vertical wall portion 46f, and this groove faces the engine 7.

Each relay member 46E is made of groove-shaped steel material, and this groove faces outward in the lateral direction of the vehicle and extends in the front-rear direction. The groove of the relay member 46E is covered with a vertical wall member 46G that is made of a metal plate and formed in a bent shape. Thus, a through-hole 46F is produced that passes through a vertically intermediate portion of each column 46 in the front-rear direction.

The vertical wall member 46G is fixed with bolts to the first vertical wall portion 46e in a detachable manner.

It is thereby possible to easily dispose utility pipes, which were disposed between the lateral sides of the engine 7 and the hood 11, by passing the utility pipes through the through-hole 46F even in a case where, for example, the left and right columns 46 are fixed to the engine frame 6 in a state of being close to the lateral sides of the engine in order to prevent the horizontal width of the hood 11 from unnecessarily increasing in size. Note that examples of the utility pipes include a wiring harness 52 that extends to electric parts such as the battery 34 and the indoor unit 23A of the air-conditioning device 23, a hot water hose 53 for circulating a cooling water (hot water) after cooling the engine as a heat medium through the motor portion 2 and the indoor unit 23A of the air-conditioning device 23, a refrigerant pipe 54 for circulating a coolant through the indoor unit 23A and the outdoor unit 23B of the air-conditioning device 23, and the like.

Upper and lower wall portions 46h and 46i that are provided in each relay member 46E and border the through-hole 46F function as a face for guiding or supporting the utility pipes. If the utility pipes are made of a material that absorbs vibration, such as elastic hoses, vibration that propagates through the wall face of the through-hole 46F can be absorbed as a result of the utility pipes coming in close contact with the wall face.

Moreover, the vertical wall member 46G covering each through-hole 46F is detachable from the column 46, which is convenient for tasks of installation and maintenance of the utility pipe.

As shown in FIGS. 2 and 5 to 8, the lower end portion of each second vertical wall portion 46f partially protrudes outward of the coupling plate 46B. With this configuration, when the coupling plates 46B provided at the lower end of the columns 46 are coupled to the left and right brackets 50 of the engine frame 6, the positioning in the front-rear direction is realized as a result of the lower end portions of the front and rear second vertical wall portions 46f of the columns 46 coming in contact with the front end and the lower end of the corresponding brackets 50.

As shown in FIGS. 1 to 5, in a state where the left and right columns 46 are fixed, the through-holes 46F are located upward of a lower edge 11a of the hood 11 covering the engine 7, the exhaust gas purification device 29, and the like. The utility pipes that are passed through the through-holes 46F are thereby covered with the hood 11.

Other Embodiments

[1] The engine 7 may be a gasoline engine. Alternatively, it may be a diesel engine including a common-rail fuel injection system.

[2] The exhaust gas treatment device 29 may be a muffler, an exhaust gas purification device that only includes an oxidation catalyst, an exhaust gas purification device including the DPF 38 that carries a catalyst, or the like. Furthermore, the exhaust gas purification device including the DPF 38 may increase the temperature of exhaust gas that passes through the DPF 38 with post-injection after main injection by a fuel injection system, or include a heater for increasing the temperature of exhaust gas that passes through the DPF 38. The orientation at which the exhaust gas treatment device 29 is installed may be modified in various manners. For example, the exhaust gas treatment device 29 may be disposed at an orientation in the front-rear direction of the vehicle.

[3] The suction pipe 40 of the exhaust gas treatment device 29 may be one in which the lower pipe portion 40B thereof is formed in a bent state where it is vertically suspended at a vertical orientation toward the exhaust portion 41A from the extended end of the upper pipe portion 40A, which extends at a rear-lowered inclined orientation toward the lower rear side from the rear part of the exhaust gas purification device 29. Alternatively, the suction pipe 40 may be constituted by an upper pipe portion 40A that extends at a front-lowered inclined orientation toward the lower front side from the front part of the exhaust gas purification device 29, and a lower pipe portion 40B that extends at a larger depression angle than that of the upper pipe portion 40A from the extended end of the upper pipe portion 40A toward the exhaust portion 41A. Furthermore, the suction pipe 40 may be constituted by an upper pipe portion 40A that extends at a left-lowered or right-lowered inclined orientation from the left end or right end of the exhaust gas purification device 29 toward the lower left side or lower right side, and a lower pipe portion 40B that extends at a larger depression angle than that of the upper pipe portion 40A from the extended end of the upper pipe portion 40A toward the exhaust portion 41A.

The flange 42 on the exhaust gas purification device side and the flange 43 on the exhaust manifold side may be formed in a circular shape or in a square shape. Further, the joint face therebetween may be set to be horizontal.

The working vehicle according to the present invention is applicable to various working vehicles including an exhaust gas treatment device, such as, for example, a tractor, a mowing machine, a combine harvester, a rice planting machine, a wheel loader, and a backhoe.

What is claimed is:

1. A working vehicle comprising:
    an engine;
    a vehicle body frame on which the engine is mounted;
    an exhaust gas treatment device for treating exhaust gas of the engine;
    a fixing base for fixing the exhaust gas treatment device, the fixing base being separated from the engine by a gap;
    a support body for connecting the fixing base to the vehicle body frame, the support body being separated from the engine by a gap; and
    a bellows pipe for absorbing solid-borne sound, the bellows pipe being provided in a connection area where a suction pipe of the exhaust gas treatment device is connected to an exhaust manifold of the engine,
    wherein the suction pipe includes an upper pipe portion extending from a portion below a transverse cross-sectional center of the exhaust gas treatment device and being bent obliquely downward at an obtuse angle, and a lower pipe portion forming the connection area, and a depression angle of a pipe axis of the lower pipe portion relative to the exhaust gas treatment device is larger than that of the upper pipe portion.

2. The working vehicle according to claim 1, wherein the vehicle body frame includes an engine mounting frame and a transmission case that is connected to a rear part of the engine mounting frame.

3. The working vehicle according to claim 1, wherein the fixing base is located above the engine, and the support body is a columnar body.

4. The working vehicle according to claim 1, wherein the support body includes a first columnar member standing up from the vehicle body frame along one side face of the engine, and a second columnar member standing up from the vehicle body frame along another side face of the engine.

5. The working vehicle according to claim 1, wherein the lower pipe portion is a straight pipe.

6. The working vehicle according to claim 1, wherein the bellows pipe is installed between the upper pipe portion and the lower pipe portion.

7. The working vehicle according to claim 1, wherein the lower pipe portion is provided with an upper flange, and a terminal of the exhaust manifold is provided with a lower flange connected to the upper flange so as to align a face of the lower flange with a face of the upper flange such that gas can flow.

8. The working vehicle according to claim 7, wherein a coupling face between the upper flange and the lower flange is an inclined face, and the inclined face is inclined such that a portion thereof close to the exhaust gas treatment device is at a lower position.

9. The working vehicle according to claim 1, wherein the vehicle body includes a first engine frame extending on one side of the engine, and a second engine frame extending on another side of the engine, and the support body includes a first column having one end coupled to the first engine frame and another end coupled to one side end of the fixing base, and a second column having one end coupled to the second engine frame and another end coupled to another side end of the fixing base.

10. The working vehicle according to claim 9, wherein a through-hole through which a utility pipe is passed is formed in the first column and/or the second column.

11. A working vehicle comprising:
    an engine;
    a vehicle body frame on which the engine is mounted;
    an exhaust gas treatment device for treating exhaust gas of the engine;
    a fixing base for fixing the exhaust gas treatment device, the fixing base being separated from the engine by a gap;
    a support body for connecting the fixing base to the vehicle body frame, the support body being separated from the engine by a gap; and
    a bellows pipe for absorbing solid-borne sound, the bellows pipe being provided in a connection area where a suction pipe of the exhaust gas treatment device is connected to an exhaust manifold of the engine,
    wherein the fixing base has a cutaway portion defined therein, the suction pipe extending through the cutaway portion,
    wherein the vehicle body frame includes a first engine frame extending on one side of the engine, and a second engine frame extending on another side of the engine, and the support body includes a first column having one end coupled to the first engine frame and another end coupled to one side end of the fixing base, and a second column having one end coupled to the second engine frame and another end coupled to another side end of the fixing base, and
    wherein a through-hole through which a utility pipe is passed is formed in the first column and/or the second column.

12. The working vehicle according to claim 11, wherein the vehicle body frame includes an engine mounting frame and a transmission case that is connected to a rear part of the engine mounting frame.

13. The working vehicle according to claim 11, wherein the fixing base is located above the engine, and the support body is a columnar body.

14. The working vehicle according to claim 11, wherein the first column stands up from the vehicle body frame along one side face of the engine, and the second column stands up from the vehicle body frame along another side face of the engine.

15. The working vehicle according to claim 11, wherein the utility pipe is an elastic hose, and is in close contact with a wall face of the through-hole.

16. The working vehicle according to claim 11, wherein the exhaust gas treatment device includes a continuous regenerating diesel particulate filter (DPF).

* * * * *